Patented Sept. 7, 1948

2,448,666

UNITED STATES PATENT OFFICE 2,448,666

POLYETHYLENE-POLYVINYL ACETAL COMPOSITION

David A. Fletcher, Pompton Plains, and Malcolm M. Renfrew, Arlington, N. J., assignors to E. I. du Pont de Nemours & Company, Wilmington, Del., a corporation of Delaware No Drawing. Application June 14, 1944, Serial No. 540,314

6 Claims. (Cl. 260—45.4)

This invention relates to synthetic resin coatings and, more particularly, to articles having an at least semi-rigid surface, the surface having superimposed thereon a film essentially composed of a mixture of a polyvinyl acetal resin and an ethylene polymer, and to the coating composition employed for producing said film.

Polyvinyl acetal resins and various ethylene polymers have both been employed separately heretofore in many and varied applications, such as coating compositions, molding compositions, safety glass interlayers, and calendering compositions. However, these substances are substantially incompatible with one another in the sense of being incapable of mutually dissolving each other and, consequently, mixtures comprising these two substances would ordinarily not be considered as useful for any application. Thus, if a molding composition be compounded by mixing various proportions of these two substances and an article be formed therefrom by injection or compression molding, the resulting article will possess undesirable physical properties, such as a very low degree of tensile strength and opacity to light, due to the incompatibility of these two ingredients with one another.

An object of the present invention is to provide new and useful coatings for at least semi-rigid surfaces. A further object is to provide protective and adhesive coatings essentially composed of incompatible components and to provide a method of superimposing such coatings on at least semi-rigid surfaces. Other objects will be apparent from the description of the invention given hereinafter.

The above objects are accomplished according to the present invention by superimposing on an at least semi-rigid surface a continuous film essentially composed of a uniform mixture of a polyvinyl acetal resin of the composition:

| | Per cent |
|---|---|
| Ester content as polyvinyl ester | Up to 10 |
| Hydroxyl content as polyvinyl alcohol | Up to 30 |
| Acetal content as polyvinyl acetal | Above 60 | and a solid ethylene polymer having a molecular weight above 6,000. This film may be superimposed on the surface in any of several ways as will be described below. The mixture employed may comprise, by weight, 10 parts of the polyvinyl acetal resin and 1–100 parts of the ethylene polymer.

The present invention resides partly in the discovery that mixtures of these polyvinyl acetal resins and ethylene polymers, despite their known incompatibility with each other, will form, contrary to all expectations, continuous films highly useful for coating at least semi-rigid surfaces. The films are continuous, apparently homogeneous, and entirely clear and transparent in the absence of pigments, fillers, or other opacifying agents, and thoroughly serviceable on at least semi-rigid surfaces. That the resins are not truly compatible in the sense of mutually dissolving each other is apparent from the fact that, when applied to a highly flexible surface, they will normally show an opaque streak if the surface is creased sharply, indicating the film has been reduced to a discontinuous state along the line of the crease. The invention is not applicable to the coating of surfaces that may be creased sharply and is only of real utility when applied to a surface which is rigid or at least semi-rigid.

Polyvinyl acetal resins, as is well known, are produced by the condensation of an aldehyde with polyvinyl alcohol or a partially hydrolyzed polyvinyl ester of a monocarboxylic acid. These latter water-soluble materials are generally referred to by the art as "polyvinyl alcohol" although they generally, but not necessarily, contain in addition to a preponderance of hydroxyl groups a minor proportion of unsaponified ester groups. Consequently, since the aldehyde does not necessarily react with all of the hydroxyl groups of the partially hydrolyzed polyvinyl esters, the resulting polyvinyl acetal resin frequently contains a very minor proportion of unsaponified ester groups, a certain proportion of hydroxyl groups, and, predominantly, acetal groups.

Solid ethylene polymers may be obtained by subjecting ethylene to pressures in excess of 500 atmospheres under controlled elevated temperature conditions, namely, from 100° C. to 400° C. This results in solid ethylene polymers possessing a molecular weight of at least 6,000, a melting point of from about 100° C. to about 120° C., depending upon the molecular weight, and corresponding in composition substantially to $$(CH_2)_x$$

and when subjected to X-ray defraction analysis show crystalline structure. These solid polymers of ethylene, also referred to generally as polyethylene, and processes for their production are more fully discussed in Fawcett U. S. Patent 2,153,553.

The following examples illustrate specific embodiments of the present invention. All parts are given by weight throughout the specification and claims except where otherwise noted.

Example I

A mixture of 50 parts of a polyvinyl butyral resin of the following composition:

| | Per cent |
|---|---|
| Ester content as polyvinyl acetate | 1 |
| Hydroxyl content as polyvinyl alcohol | 19 |
| Acetal content as polyvinyl butyral | 80 | and 50 parts of ethylene polymer of average molecular weight above 20,000, was prepared by mechanically blending fine powders of the two substances. A thin layer of this powder mixture was placed upon a maple wood panel measuring 11 x 17 x 1". This wood panel and the powder coating were then placed in a hydraulic press equipped with polished metal faces and subjected to a temperature of about 160° C. and pressure of 200 lbs. per square inch for five minutes. Cold water was run through the platen of the press and when it was cooled to room temperature, the pressure on the panel and its coating was released and the panel was removed from the press. The panel thus produced possessed attractive highly polished, waxed-like surface on that side which was coated with the ethylene polymer/polyvinyl butyral resin mixture. The resulting coating exhibited excellent adhesion to the wood.

A coating on maple wood prepared similarly to that discussed above, but which consisted simply of the ethylene polymer, possessed a fine, highly polished surface, but could be readily stripped from the wood due to the poor adhesion qualities of the coating to the wood.

Example II

A mixture in finely divided form sufficiently small to pass an 80 mesh per inch screen but coarse enough to be retained upon a 200 mesh per inch screen, was prepared by mechanically blending the following ingredients:

| | Parts |
|---|---|
| Ethylene polymer (20,000 to 40,000 molecular weight) | 100 |
| Polyvinyl butyral resin | 100 |
| Phenyl alpha-naphthylamine | 2 |

The composition of the polyvinyl butyral resin was:

| | Per cent |
|---|---|
| Ester content as polyvinyl ester | 1 |
| Hydroxyl content as polyvinyl alcohol | 16 |
| Acetal content as polyvinyl butyral | 83 |

This powder mixture was applied to small steel panels measuring 4"x2"x⅛" by flame-spraying through a device known as a powder-pistol such as described in U. S. Patent 2,108,998 and Reissue Patent 20,425. The resulting uniform coating exhibited excellent adhesion to the metal surface after exposure for 12 days at 20° C. to an aqueous 4% sodium chloride solution.

In a similar case to that described above, but where the coating comprised the indicated ethylene polymer plus 1% of the anti-oxidant, phenyl alpha-naphthylamine, without the polyvinyl butyral resin, a good coating was obtained upon the metal surface when initially applied. However, after exposure for twelve days at 20° C. to a 4% aqueous sodium chloride solution, the adhesion of this coating was inferior to that of the former.

In a third instance where the coating comprised the indicated polyvinyl butyral resin, plus 1% of the anti-oxidant, without the ethylene polymer, a good coating was obtained when applied by the indicated process. However, the exposure test of immersion for 12 days at 20° C. in an aqueous 4% NaCl solution definitely demonstrated that the corrosion-preventative properties of this latter coating were inferior to that of the mixed coating.

Example III

The procedure of Example II was repeated with the exception that polyvinyl butyral resin of the following composition:

| | Per cent |
|---|---|
| Ester content as polyvinyl ester | 1 |
| Hydroxyl content as polyvinyl alcohol | 10 |
| Acetal content as polyvinyl butyral | 89 | was substituted for the polyvinyl butyral resin of the former example. The coating applied to the steel panels exhibited good corrosion-preventative properties and good adhesion to the panels after two months exposure at 20° C. to a 4% aqueous sodium chloride solution.

Example IV

The procedure of Example II was again repeated with the substitution of a polyvinyl butyral resin of the following composition:

| | Per cent |
|---|---|
| Ester content as polyvinyl ester | 1 |
| Hydroxyl content as polyvinyl alcohol | 19 |
| Acetal content as polyvinyl butyral | 80 | for the polyvinyl butyral resin of Example II. The flame-sprayed coatings resulting therefrom exhibited fair corrosion-preventative properties after three weeks exposure to 4% aqueous sodium chloride solution at 20° C., but were inferior to those properties exhibited by the coating of Example III.

Example V

A mixture of the following materials:

| | Parts |
|---|---|
| Ethylene polymer (20,000-40,000) | 50 |
| Polyvinyl butyral resin | 50 | was prepared by working the ingredients on mill-rolls at 140° C. for fifteen minutes. The composition of the polyvinyl butyral resin was:

| | Per cent |
|---|---|
| Ester content as polyvinyl ester | 1 |
| Hydroxyl content as polyvinyl alcohol | 16 |
| Acetal content as polyvinyl butyral | 83 |

This mixture was then charged into a suitable mold and compression molded into the form of a block by subjecting the same to a temperature of about 125° C. and pressure of 1000 lbs. per square inch for four hours.

Sheets of this resin mixture 0.007" in thickness were prepared by slicing the same from the molded block. One of these sheets was applied to a maple wood panel by pressing the same between polished metal plates for five minutes at 160° C. and pressure of 100 lbs. per square inch. A sheet of pure ethylene polymer of molecular weight about 30,000 and 0.007" in thickness was then applied to the resin coated surface of the maple wood panel by pressing the same at a pressure of 100 lbs. per square inch between polished metal plates for fifteen minutes at 160° C. The resulting coated wood panel possessed a fine, highly polished, attractive surface similar to, but superior to, in most respects, a highly waxed wood surface. The ethylene polymer sheet adhered with great tenacity to the wood panel.

In another case wherein an ethylene polymer sheet was applied to a wood panel by the procedure indicated above, but in which the panel was not first coated with the adhesive layer of ethylene polymer/polyvinyl butyral resin, the ethylene polymer coating could be stripped easily from the panel.

In still another case, the ethylene polymer sheet and polyvinyl butyral resin/ethylene polymer interlayer were applied to the panel in one pressing operation rather than the two separate pressing steps indicated above. The resulting coating was comparable to that resulting in the first case of this example.

*Example VI*

A solution was made up as follows:

| | Parts |
|---|---|
| Ethylene polymer (20,000–40,000) | 5 |
| Polyvinyl butyral resin | 5 |
| Toluene (solvent) | 90 |

The composition of the polyvinyl butyral resin was:

| | Per cent |
|---|---|
| Ester content as polyvinyl ester | 1 |
| Hydroxyl content as polyvinyl alcohol | 10 |
| Acetal content as polyvinyl butyral | 89 |

The solution was heated to 110° C., cast on a glass plate, and seasoned in an oven at 140° C. A clear film was obtained which adhered to the glass tenaciously and had to be cut loose with a razor blade as contrasted to a straight ethylene polymer film which may be readily peeled from a glass surface. The film when sharply creased, showed a white line and seemed somewhat fibrous despite being apparently homogeneous and compatible before creasing.

It will be understood that the above examples are merely illustrative and the invention broadly comprises superimposing on an at least semirigid surface a continuous film essentially composed of a uniform mixture of a polyvinyl acetal resin and a solid ethylene polymer having a molecular weight above 6,000.

Various polyvinyl acetal resins may be employed in the present invention. Thus, polyvinyl acetal resins resulting from the condensation of polyvinyl alcohol or a partially hydrolyzed polyvinyl ester with such aldehydes as formaldehyde, acetaldehyde, propionaldehyde, butyraldehyde, furfural, benzaldehyde, and the like, may be employed providing the resins possess a composition containing 30% or less of hydroxyl content calculated as polyvinyl alcohol, an ester content of less than 10% calculated as polyvinyl ester, and an acetal content of more than 60% calculated as polyvinyl acetal. The polyvinyl acetal resins resulting from the condensation of butyraldehyde are preferred and, particularly, polyvinyl butyral resins of the composition:

| | |
|---|---|
| Ester content calculated as polyvinylester | Up to 2% |
| Hydroxyl content calculated as polyvinyl alcohol | Between 9% and 13.5% |
| Butyral content calculated as polyvinyl butyral | Between 91% and 85.5% | are preferred.

The solid ethylene polymers adapted for use in the present invention are those having a molecular weight above 6,000 and, in particular, those solid ethylene polymers having a molecular weight between 10,000 and 40,000 are preferred. The molecular weights of these materials are determined by the well known viscosity method of Staudinger (1933 Ann. 502, 201).

The proportion of ethylene polymer to polyvinyl acetal resin in the coatings of the present invention may be varied over wide limits. Those compositions wherein 10 parts of the polyvinyl acetal resin are employed with 1–100 parts of the ethylene polymer have been found most useful and the coatings in which 10 parts of the polyvinyl acetal resin are employed with 5–20 parts of the ethylene polymer are preferred. The exact proportion of these two ingredients in the coatings is, of course, influenced by the particular application for which the coating is to be employed and by the structure to which it is to be applied. Where a coating is to be applied to a metallic surface by flame-spraying, equal parts of the two components have been found preferable.

The properties of the coatings of this invention may be modified by the addition of such materials as coloring materials, luminescent pigments, antioxidants, and other natural or synthetic resins. Furthermore, it is quite feasible to modify the properties of the coatings by employing various mixtures of polyvinyl acetal resins and ethylene polymers in their preparation, i. e., various polyvinyl acetal resins comprising different aldehydes such as polyvinyl formal, polyvinyl benzal, polyvinyl butyral, and the like, or various acetal resins derived from the same aldehyde but possessing different degrees of acetalization may be incorporated with one or more separate ethylene polymers, for example, an ethylene polymer of molecular weight of 6,000 with an ethylene polymer of molecular weight of 40,000.

As indicated by the foregoing examples, the coatings of this invention may be applied to surfaces by various methods. Thus, they may be applied by flame-spraying from a suitable powder pistol, by applying a powder mixture to the surface and hot-pressing the same to the surface, by forming sheets of the mixture and hot-pressing these sheets to the desired surface, or the coating may be applied from a solution of the mixture in a suitable organic solvent for the various components, preferably a relatively volatile one such as carbon tetrachloride, chloroform, and toluene. The specific method of application of the coating will depend upon the article to be coated and, to some extent, upon the nature of the materials to be employed as the coating. Coating by flame-spraying has been found to yield a coating possessing the most desirable properties.

The coatings of this invention are effective as adhesive layers for joining plastic materials to various surfaces such as wood. This is illustrated in Example V in which a preformed sheet of a polyvinyl butyral-ethylene polymer plastic is used to adhere a preformed sheet of pure ethylene polymer to a maple wood panel. Instead of using a preformed sheet, the polyvinyl acetal-ethylene polymer mixture may be flame-sprayed on the surface to give a film of the desired thickness as, for example, .007 in., and then a coating of pure ethylene polymer may be flame-sprayed on top of the film thus deposited or a preformed sheet of ethylene polymer may be applied to the film by pressing at an elevated temperature. In either case the adhesion of the ethylene polymer film is far superior to the adhesion resulting when the film is applied directly to the wood surface. Obviously, metal surfaces and the like may be coated in this manner as well as wood surfaces and the top film may be of various plastics as well as ethylene polymer.

The present invention provides new and useful coatings which may be employed for various purposes. They are admirably suited as corrosion-preventative coatings for metallic surfaces. They are also well suited as adhesive layers for joining plastic materials to various surfaces such as wood, as mentioned above. With the incorporation of suitable dyes or pigments, the coatings are adapted as decorative or ornamental coverings for various articles. The utility of and desirable properties of coatings comprising polyvinyl acetal resins and ethylene polymers for the purposes indicated are indeed surprising for, although the general incompatibility of the two materials militates against their utilization in molded or similar bodies, this factor does not affect their properties when applied as coatings to semi-rigid surfaces, the resulting film being continuous, uniform, and, apparently, its components compatible with each other.

As many apparently widely different embodiments of this invention may be made without departing from the spirit and scope thereof, it is to be understood that the invention is not limited to the specific embodiments thereof except as defined in the appended claims.

We claim:

1. An article having an at least semi-rigid surface, said surface bearing a coating essentially composed of a uniform mixture of 10 parts of a polyvinyl acetal resin of the composition:

| | Per cent |
|---|---|
| Ester content as polyvinyl ester | Up to 10 |
| Hydroxyl content as polyvinyl alcohol | Up to 30 |
| Acetal content as polyvinyl acetal | Above 60 | and 5-20 parts of polyethylene having a molecular weight above 6,000.

2. An article having an at least semi-rigid surface, said surface bearing a coating essentially composed of a uniform mixture of 10 parts of a polyvinyl butyral resin of the composition:

| | Per cent |
|---|---|
| Ester content as polyvinyl ester | Up to 10 |
| Hydroxyl content as polyvinyl alcohol | Up to 30 |
| Butyral content as polyvinyl butyral | Above 60 | and 5-20 parts of polyethylene having a molecular weight of 10,000-40,000.

3. An article having an at least semi-rigid surface, said surface bearing a coating essentially composed of a uniform mixture of 10 parts of a polyvinyl butyral resin of the composition:

| | Per cent |
|---|---|
| Ester content as polyvinyl ester | Up to 2 |
| Hydroxyl content as polyvinyl alcohol | 9-13.5 |
| Butyral content as polyvinyl butyral | 91-85.5 | and 5-20 parts of polyethylene having a molecular weight of 10,000-40,000.

4. A coating composition essentially comprising a uniform mixture of 10 parts of a polyvinyl acetal resin of the composition:

| | Per cent |
|---|---|
| Ester content as polyvinyl ester | Up to 10 |
| Hydroxyl content as polyvinyl alcohol | Up to 30 |
| Acetal content as polyvinyl acetal | Above 60 | and 5-20 parts of polyethylene having a molecular weight above 6,000.

5. A coating composition essentially comprising a uniform mixture of 10 parts of a polyvinyl butyral resin of the composition:

| | Per cent |
|---|---|
| Ester content as polyvinyl ester | Up to 10 |
| Hydroxyl content as polyvinyl alcohol | Up to 30 |
| Butyral content as polyvinyl butyral | Above 60 | and 5-20 parts of polyethylene having a molecular weight above 6,000.

6. A coating composition essentially comprising a uniform mixture of 10 parts of a polyvinyl butyral resin of the composition:

| | Per cent |
|---|---|
| Ester content as polyvinyl ester | Up to 2 |
| Hydroxyl content as polyvinyl alcohol | 9-13.5 |
| Butyral content as polyvinyl butyral | 91-85.5 | and 5-20 parts of polyethylene having a molecular weight of 10,000-40,000.

DAVID A. FLETCHER.
MALCOLM M. RENFREW.

REFERENCES CITED

The following references are of record in the file of this patent:

UNITED STATES PATENTS

| Number | Name | Date |
|---|---|---|
| 1,927,086 | Ellis | Sept. 19, 1933 |
| 2,137,442 | Callan | Nov. 22, 1938 |
| 2,153,553 | Fawcett et al. | Apr. 11, 1939 |
| 2,188,707 | Crocker | Jan. 30, 1940 |
| 2,212,155 | Ellis | Aug. 20, 1940 |
| 2,268,121 | Kingsley | Dec. 30, 1941 |
| 2,278,141 | Warth | Mar. 31, 1942 |
| 2,279,774 | Bolton | Apr. 14, 1942 |
| 2,326,698 | Swain | Aug. 10, 1943 |